United States Patent [19]

Newman et al.

[11] Patent Number: 5,665,951
[45] Date of Patent: Sep. 9, 1997

[54] CUSTOMER INDICIA STORAGE AND UTILIZATION SYSTEM

[76] Inventors: Gary H. Newman, 115 N. Branch Rd.; Sumin Tchen, 188 Independence Rd., both of Concord, Mass. 01742

[21] Appl. No.: 597,436

[22] Filed: Feb. 8, 1996

[51] Int. Cl.⁶ .................................................. G06F 17/00
[52] U.S. Cl. ................................... 235/375; 235/380
[58] Field of Search ................................ 235/375, 380, 235/462, 472

[56] References Cited

U.S. PATENT DOCUMENTS

| | | | |
|---|---|---|---|
| 4,703,423 | 10/1987 | Bado et al. | 364/400 |
| 4,795,898 | 1/1989 | Bernstein | 235/487 |
| 4,798,322 | 1/1989 | Bernstein et al. | 235/487 |
| 4,835,372 | 5/1989 | Gombrich et al. | 235/375 |
| 4,837,422 | 6/1989 | Dethloff et al. | 235/380 |
| 4,874,935 | 10/1989 | Younger | 235/492 |
| 4,929,819 | 5/1990 | Collins, Jr. | 235/383 |
| 4,968,873 | 11/1990 | Dethloff et al. | 235/380 |
| 5,186,281 | 2/1993 | Jenkins | 186/55 |
| 5,227,874 | 7/1993 | Von Kohorn | 358/84 |
| 5,424,524 | 6/1995 | Ruppert et al. | 235/462 |
| 5,457,305 | 10/1995 | Akel et al. | 235/379 |

*Primary Examiner*—Donald T. Hajec
*Assistant Examiner*—Karl Frech
*Attorney, Agent, or Firm*—Richard A. Jordan

[57] ABSTRACT

A system for assisting a customer during shopping includes machine-readable currently-owned item indicia store and a compatibility determination subsystem. The machine-readable currently-owned item indicia store includes a smart-card, magnetic disk or the like, for storing indicia identifying selected characteristics of items which are currently owned by the customer, including such information as, for example, accurate color and/or styling parameter and metric information. The compatibility determination subsystem generates a compatibility assessment in response to the currently-owned item indicia stored by the currently-owned item indicia store, indicia identifying selected characteristics for items provisionally selected by the customer, and compatibility parameter information identifying compatibilities among various types of indicia.

28 Claims, 5 Drawing Sheets

1

CUSTOMER INDICIA STORAGE AND UTILIZATION SYSTEM

FIELD OF THE INVENTION

The invention relates generally to the field of electronic systems for facilitating retail transactions, and more particularly to systems for allowing a prospective customer to determine whether items selected for purchase are compatible with items currently owned by the prospective customer, whether a plurality of items selected for purchase are compatible with each other, and whether a plurality of items already owned are compatible with each other. The invention provides, in one embodiment, a wardrobe information storage and utilization system which facilitates selection by a customer of clothing based on compatibility of the selected clothing with items of clothing that are currently in the customer's wardrobe, and in addition can indicate whether a plurality of selected clothing items and/or items currently in the customer's wardrobe are compatible with each other.

BACKGROUND OF THE INVENTION

For a number of types of products, shopping can be quite difficult, particularly if it is desired that the products which are being sought be compatible with products currently owned by the customer. In, for example, shopping for clothes, oftentimes a customer must either take particular items of clothing which he or she owns, with him or her to the store to verify that newly-acquired products are compatible with the currently-owned products. If a number of new products are to be acquired, this can be an arduous task, and in that case the customer may, instead, wish to rely on his or her memory, but in that case he or she will risk the possibility that newly-acquired products will not be compatible.

A similar problem arises in connection with catalog shopping, particularly, for example, when the catalog product information is obtained over a computer network. Since current computer monitor displays do not render colors and graphics uniformly or accurately, it is often difficult merely from looking at product displays to determine their colors and styles. Even with print catalogs, the printing processes used to render the colors and styles of the products often provide inaccurate rendering of the product's color and style. Accordingly, it is often difficult merely from looking at either a rendering of a product in a printed catalog or on a computer monitor display whether the actual product is compatible with products currently owned by the prospective customer.

SUMMARY OF THE INVENTION

The invention provides new and improved systems for allowing a prospective customer to determine whether items selected for purchase are compatible with items currently owned by the prospective customer, whether a plurality of items selected for purchase are compatible with each other, whether a plurality of items already owned are compatible with each other, and the like.

In brief summary, a system for assisting a customer during shopping includes a machine-readable currently-owned item indicia store and a compatibility determination subsystem. The machine-readable currently-owned item indicia store includes a smart-card, magnetic disk or the like, for storing indicia identifying selected characteristics of items which are currently owned by the customer, including such information as, for example, accurate color and/or styling parameter and metric information. The compatibility determination subsystem generates a compatibility assessment in response to the currently-owned item indicia stored by said currently-owned item indicia store, indicia identifying selected characteristics for items provisionally selected by the customer, and compatibility parameter information identifying compatibilities among various types of indicia.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
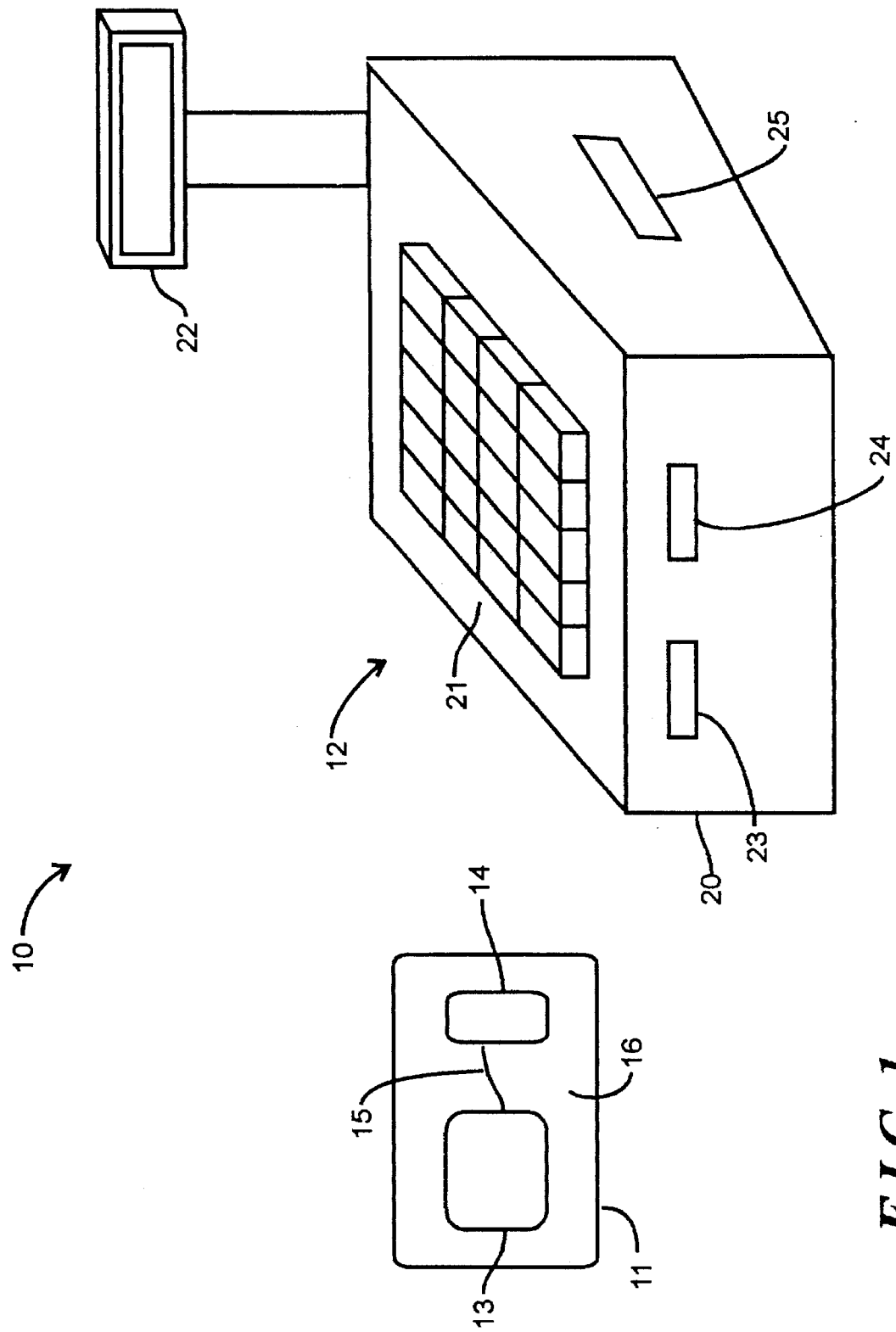
FIG. 1 is a diagram illustrating one embodiment of a wardrobe information storage and utilization system constructed in accordance with the invention.

Generally, the invention provides arrangements which, for example, a customer of a retail clothing store, catalog shopping outlet or the like, can use to (i) store and maintain information regarding particular items of his or her current wardrobe, such as color, styling, and other information, such as information as to the customer's hair, eye and skin coloration, preferred fashion or color style (which may be categorized by, for example, season), preferred sizes and the like, all of which may be useful in deciding whether or not to select and possibly purchase particular clothing items from the store, catalog shopping outlet or the like, and (ii) utilize the information while making the purchasing selections, by, for example, comparing the stored color, styling and other information regarding the particular items of his or her current wardrobe with, for example, similar information that the store, catalog shopping outlet or the like maintains for various items which are available therefrom, to determine whether the available items are compatible with any of the items which are in the customer's current wardrobe. Based on the compatibility determination, the customer may decide whether to purchase particular items from the store, catalog shopping outlet or the like.

For in-store shopping, the invention provides for the storage of the current wardrobe information in a convenient and readily transportable wardrobe information storage device which the customer may use while shopping in person at a store, to identify compatible items. The store may provide a kiosk or the like which the customer may use along with the selected items and the wardrobe information storage device to provide an assessment as to the degree of compatibility between the selected items and particular items in his or her wardrobe as indicated by the information from his or her wardrobe information storage device. To accomplish this, the kiosk may store, or access from other storage, information regarding compatibility metrics and parameters which it may use to determine the compatibility among colors and styles for various types of clothing. In addition, if the customer selects particular items for purchase, the kiosk may also update the customer's wardrobe information storage device with information concerning the purchased items, which updated may be useful in connection with subsequent shopping activities. This arrangement can allow the customer to avoid taking particular items of his or her current wardrobe with him or her to the store for use in verifying compatibility, or in the alternative to avoid not taking the items with him or her and relying on his or her memory to determine the degree of compatibility between items selected for purchased with items in his or her wardrobe.

Similarly, for use in connection with shopping, for example, through a catalog shopping outlet, the invention provides an arrangement by which a customer can determine whether clothing items that are being offered through the catalog are compatible with items of his or her current wardrobe. If the catalog shopping outlet can be contacted through a computer or other communications device over, for example, a network such as the public telephony system, a cable or wireless cable connection, the Internet, or the like, the customer can select items available through the catalog shopping outlet and enable it (that is, the catalog shopping outlet) to, for example, download the color, styling and other information concerning selected items to the customer's computer. The customer's computer may also store the color, style and other information for his or her current wardrobe, and, using compatibility parameter and metric information such as that described above in connection with the kiosk, determine the degree to which the selected items will be compatible with items in the customer's current wardrobe. In addition, if the customer wishes to purchase selected items, the catalog shopping outlet may enable him or her to do so using his or her computer, in which case the computer may update the current wardrobe color and style information which it maintains for the customer. In this manner, even if the catalog shopping outlet downloads graphical images depicting the selected items, the customer need not rely on often unreliable color and graphical rendering which is likely to be available on his or her computer's monitor displays; he or she may instead rely on the generally more accurate color and style parameter and metric information which is provided by the catalog shopping outlet.

It will be appreciated that, instead of the catalog shopping outlet downloading the color and style information for selected items to the customer's computer, the customer's computer may instead upload the color and style information regarding all or a subset (which may be selected by the customer) of his or her wardrobe, and or other information as to the customer's hair, eye and skin coloration, preferred fashion or color style, preferred sizes and the like, to the catalog shopping outlet's computer. In that case, the catalog shopping outlet, also using the compatibility parameter and metric information, may identify to the customer particular compatible items among the items that it offers which he or she may wish to consider for purchase.

In addition, if the catalog shopping outlet uses catalogs printed on paper or distributed on machine-readable media such as floppy disks, CD-ROMs, or the like, it will be appreciated that it may include with a description of each item a code which identifies, for example, the color and style information for the respective item. In that case, the customer may, to determine whether particular items from the catalog are compatible with items in his or her current wardrobe, enter the code for those items in his or her computer, which may verify compatibility as described above. The codes may be rendered in, for example, alphanumeric form, or they may be rendered using bar codes or other machine readable code format, which the customer may enter using the appropriate code reader. By using the color and style parameter and metric information, the catalog shopping outlet and customer do not need to rely on the often unreliable color and graphical rendering which is likely to be available in printed catalogs or on his or her computer's monitor displays; he or she may instead rely on the generally more accurate color and style parameter and metric information to determine compatibility.

With this background, FIG. 1 is a diagram illustrating one embodiment of a wardrobe information storage and utilization system 10 constructed in accordance with the invention which would be useful in, for example, a retail shopping establishment such as a clothing store, clothing department in a department store or the like. With reference to FIG. 1, the system 10 includes a wardrobe information storage device 11 and a kiosk 12. The wardrobe information storage devices 11 may comprise any of a number of machine-readable information storage devices such as a "smart-card" information storage device (as represented in FIG. 1), a floppy disk, or other machine-readable information storage device which may be read by, preferably, an electronic device such as a digital computer or the like. A customer will use the wardrobe information storage device 11 to store color and style parameter and metric information concerning his or her current wardrobe, which he or she will use with the kiosk 12 to determine whether particular kerns which he or she selects while shopping are compatible with kerns currently in his or her wardrobe.

The kiosk 12 maybe a stand-alone device or combined with a point-of-sale terminal (such as a cash register or the like), which a retail shopping establishment may provide for use with the customers' wardrobe information storage devices 11, to assist the customers in determining whether items which they are considering for purchase are compatible with items in their current wardrobe. The kiosk 12 will include an information retrieval and storage device for retrieving the color and style parameter and metric information contained in a customer's wardrobe information storage device 11, and corresponding color and style information for selected items, and using the read information and compatibility information which it maintains determine whether the selected items are compatible with particular items in the customer's wardrobe. In addition, if the customer purchases particular items, the kiosk's information retrieval and storage device can update the information contained in the customer's wardrobe information storage device 11 with color and style parameter and metric information for the newly-purchased items.

More specifically, as shown in FIG. 1, the wardrobe information storage device 11 includes a digital information storage area 13 and a read/write contact area 14 interconnected by a connection 15. The information storage area 13 provides a digital data storage medium in which digital data representing the wardrobe color and style parameter and metric information can be stored. The read/write contact area 14 provides one or more contacts which the kiosk's information retrieval and storage device may use to retrieve data (that is, the color and style parameter and metric information) from the information storage area while performing a compatibility check operation, and store corresponding information for new purchases during an update operation. In an embodiment in which the wardrobe information storage device 11 comprises a "smart card," the information storage area 13 may comprise, for example, an electrically-erasable or -updatable read-only memory, and the read/write contact area 14 may comprise one or more electrical contacts. In that case, the information storage area 13 and read/write contact area 14 are preferably both mounted on a substrate 16, which provides signal traces interconnecting the information storage area 13 an read/write contact area. On the other hand, in an embodiment in which the wardrobe information storage device comprises a floppy disk, the information storage area may comprise a disk comprising a conventional magnetic medium, which may be mounted in a shell, with the medium being accessible through an aperture in the shell.

The kiosk 12 includes a housing 20 which may support operator input and output elements such as a keyboard 21 and an operator display 22, wardrobe information storage device read/write elements such as a floppy disk drive 23 and/or a smart card reader 24, and a sensor 25 for sensing selected item color and style indicia for items selected by a customer. If the kiosk 12 forms part of a point-of-sale terminal, an operator (who may be the customer or a salesperson of the retail establishment) may use the keyboard 21 to enter price, payment and other information required to consummate the sale. In connection with the invention, if the color and style parameter and metric information is provided for the particular items in alphanumeric form, the operator may enter the information using the keyboard 21. An operator may also enter color and/or style information using the keyboard 21, and the kiosk 12 may identify items in the retail shopping establishment's inventory which are compatible with the color(s) and/or style(s) whose information were entered. It will be appreciated that the kiosk 12 may also be provided with other operator input devices such as barcode readers or the like which may read bar code tags associated with the selected items to obtain at least some of the information which may be provided through the keyboard 21. If the color or style information is, along with price and other information, associated with particular inventory codes or other identifiers, the kiosk 12 may be able to determine the color and style parameter and metric information from the inventory codes associate with the selected items. The sensor 25 may comprise a color sensor or the like, which may detect the color of a selected item for use in determining compatibility; this may be particularly useful if, for example, the color parameter and metric is not provided in human- or machine-readable form.

As noted above, the kiosk further includes a floppy disk drive 23 and/or smart card reader 24. These items may be used to retrieve the information from a wardrobe information storage device 11 which an operator may insert therein, which information the kiosk may use in determining whether selected items are compatible with items in the customer's current wardrobe.

The display 22 may comprise an alphanumeric display which the kiosk may use to display various indicia to the operator and/or customer. The indicia that is to be displayed may include indicia indicating determinations made as to whether or not the selected items are compatible with items in the customer's current wardrobe, and in addition may identify particular items in the current wardrobe with which the selected items may be compatible. In addition, if the kiosk forms part of a point of sale terminal, the display 22 may be used to display inventory, price, payment and/or other information which is typically displayed in a sales transaction. The kiosk 12 may be provided with other types of output devices, such as hardcopy printers and the like which may be used to provide hardcopy acknowledgments or receipts concerning a sale, and in addition may identify particular items in the customer's wardrobe with which a newly-purchased item may be compatible.

Figure 2:
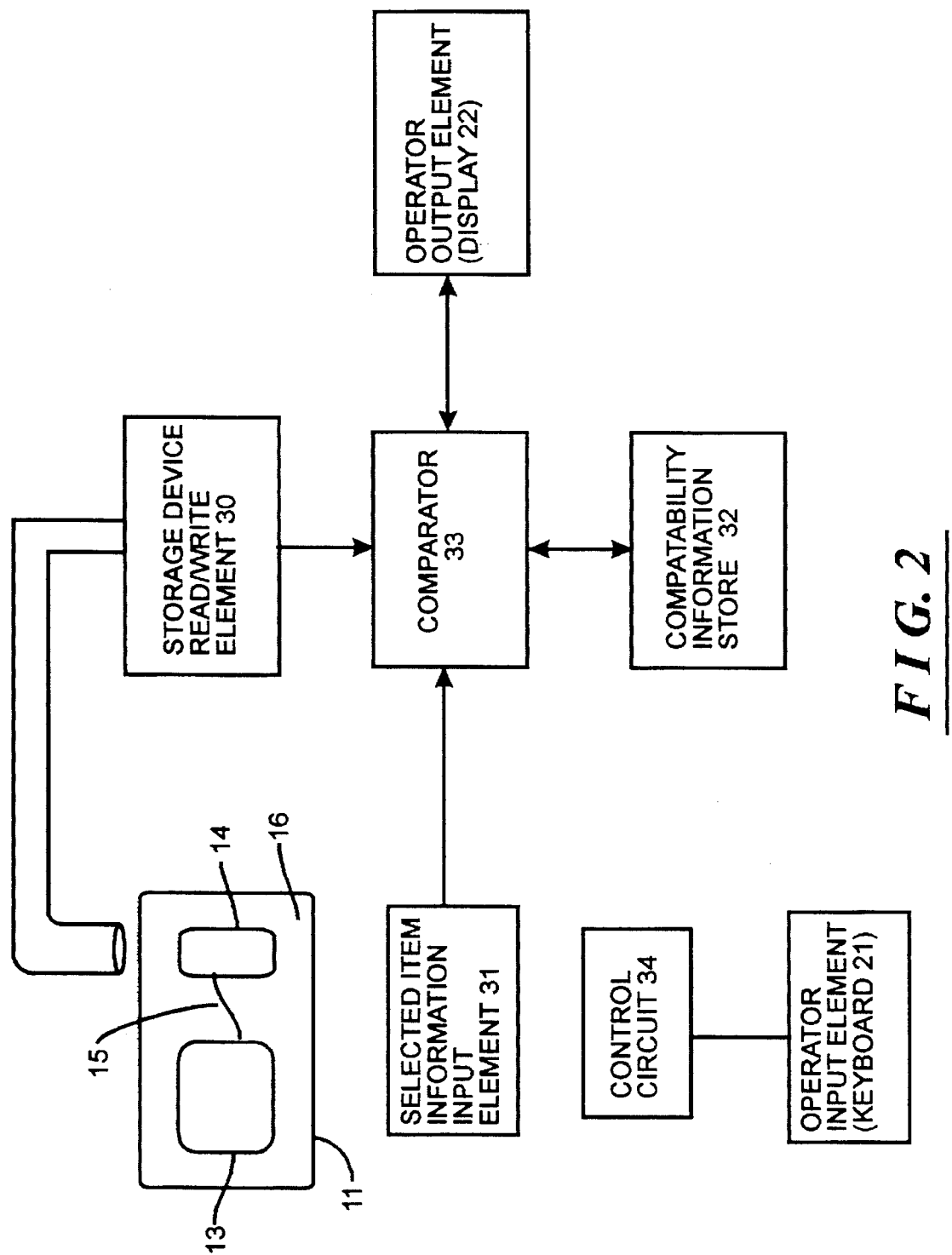
FIG. 2 is functional block diagram useful in understanding the operations of the system depicted in FIG 1.

FIG. 2 depicts a functional block diagram of a kiosk 12 useful in the system depicted in FIG. 1. With reference to FIG. 2, the kiosk 12 includes a storage device read/write element 30, a selected item information input element 31, a compatibility parameter information store 32, a comparator 33, the keyboard 21 (and/or other operator input devices) and output display 22, all under control of a control circuit 34. The storage device read/write element 30, under control of the control circuit 34, may cooperate with the floppy disk drive 23 or smart-card reader 24 to retrieve current wardrobe information from the wardrobe information storage device 11. Similarly, the selected item information input element 31, under control of the control circuit 34, may cooperate with the sensor 25 or an operator input element such as the keyboard 21, a bar code reader or the like, to obtain the color and style parameter and metric information for a item selected by the customer.

The control circuit 34 may enable the information retrieved by the elements 30 and 31 to be coupled to a comparator, along with compatibility parameter information from the compatibility parameter information store 32. The compatibility parameter information provided by the compatibility parameter information store 32 may, for example, include such information as which colors are compatible with each other, which styles are compatible with each other, and so forth. The comparator 33, in turn, compares the current wardrobe color and style parameter and metric information and the color and style parameter and metric information for the selected item, and using the compatibility parameter information from the store 32 identifies items (if any) in the customer's current wardrobe which are compatible with the selected item. The control circuit 34 may then enable the comparator 33 to provide the determination information to the display 22 for display, perhaps along with the identification of particular items in the customer's current wardrobe which are compatible with the selected item.

In addition, if the customer decides to purchase the selected item, the color and style parameter and metric information for the selected item as provided by the element 31 may, under control of the control circuit 34, be coupled to the storage device read/write dement 30, which can enable the respective floppy disk drive 22 or smart-card reader 23 to store the selected item's information on the wardrobe information storage device 11, thereby to update the information for later use.

Figure 3:
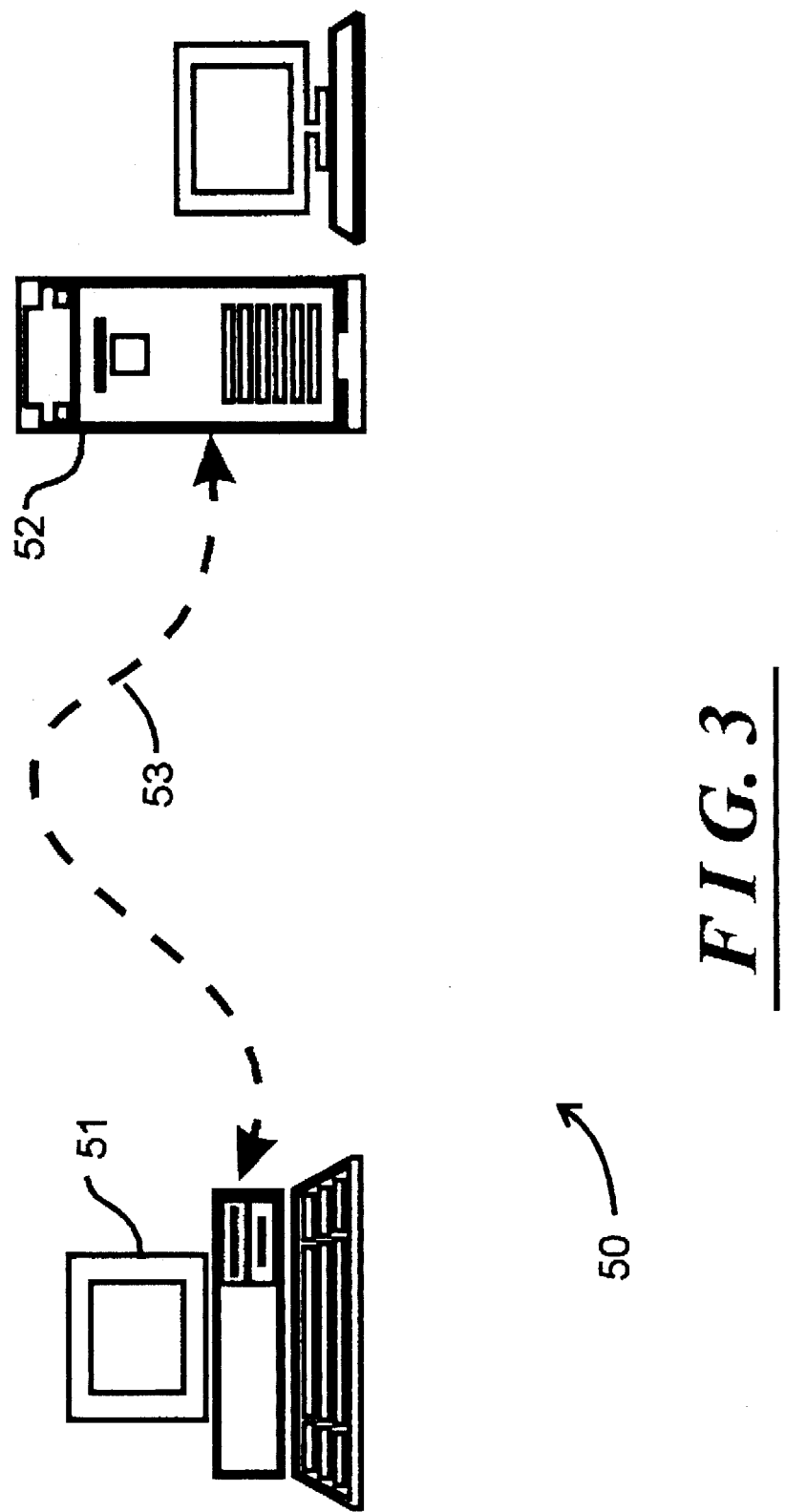
FIG. 3. is a diagram illustrating a second embodiment of a wardrobe information storage and utilization system constructed in accordance with the invention.

As described above, a system in accordance with the invention further may be used in connection with shopping through a catalog shopping outlet using, for example, a computer, over a network such as the public telephony system, a cable or wireless cable connection, the Internet, or the like. Such a system will be described in connection with FIGS. 3 and 4. With reference to FIG. 3, a system 50 includes a computer 51 or other communications device at the customer's location, and a computer 52 or other system provided by the catalog shopping outlet, interconnected by a communication link 53.

The customer's computer 51 may, for example, comprise a suitably-programmed personal or other communications device which is programmed or otherwise constructed to perform the functions described herein. If computer 51 is a personal computer, as is conventional, it will include a system unit, an operator input device such as a keyboard and/or mouse, and a display (not separately numbered). The system unit will typically include a processor and at least some information storage. The information storage, which may be an integral component of the computer 51 or removable by the operator, will preferably provide at least sufficient storage space for the customer's current wardrobe's color and style parameter and metric information and the compatibility information such as that described above in connection with store 32 (FIG. 2), and may also include storage space for programs and other types of data. The system unit will also include or be connected to a communications subsystem (not separately shown) for effecting communications over the communication link 53, for initiating contact with the catalog shopping outlet's computer 52, providing information thereto and receiving information downloaded therefrom.

The computer 52 provided by the catalog shopping outlet provides one or more database(s) maintaining information for the various products sold by the outlet, which will preferably include at least the color and/or style parameter and metric information, may also include pricing, delivery and other information as well as a graphical image for the products. Computer 52 will also preferably include a communications subsystem for effecting communications over the communication link 53, for receiving information from, for example the customer's computer 51 over communication link 53 and for downloading information from the databases to the customer's computer 51 over the communication link 53.

Figure 4:
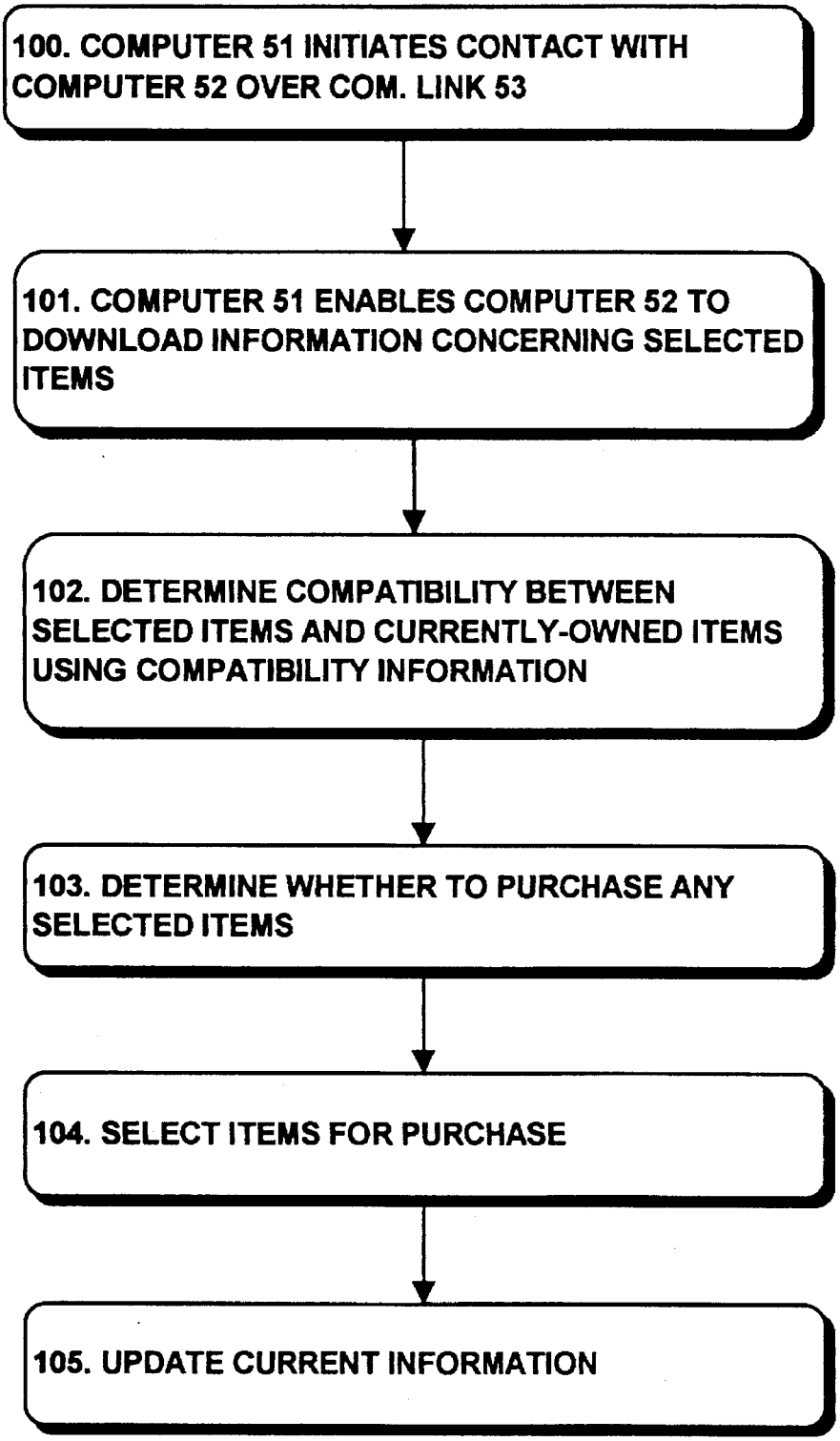
FIGS. 4 and 5 are a flow diagrams illustrating operations performed by the system depicted in FIG. 3.
Figure 5:
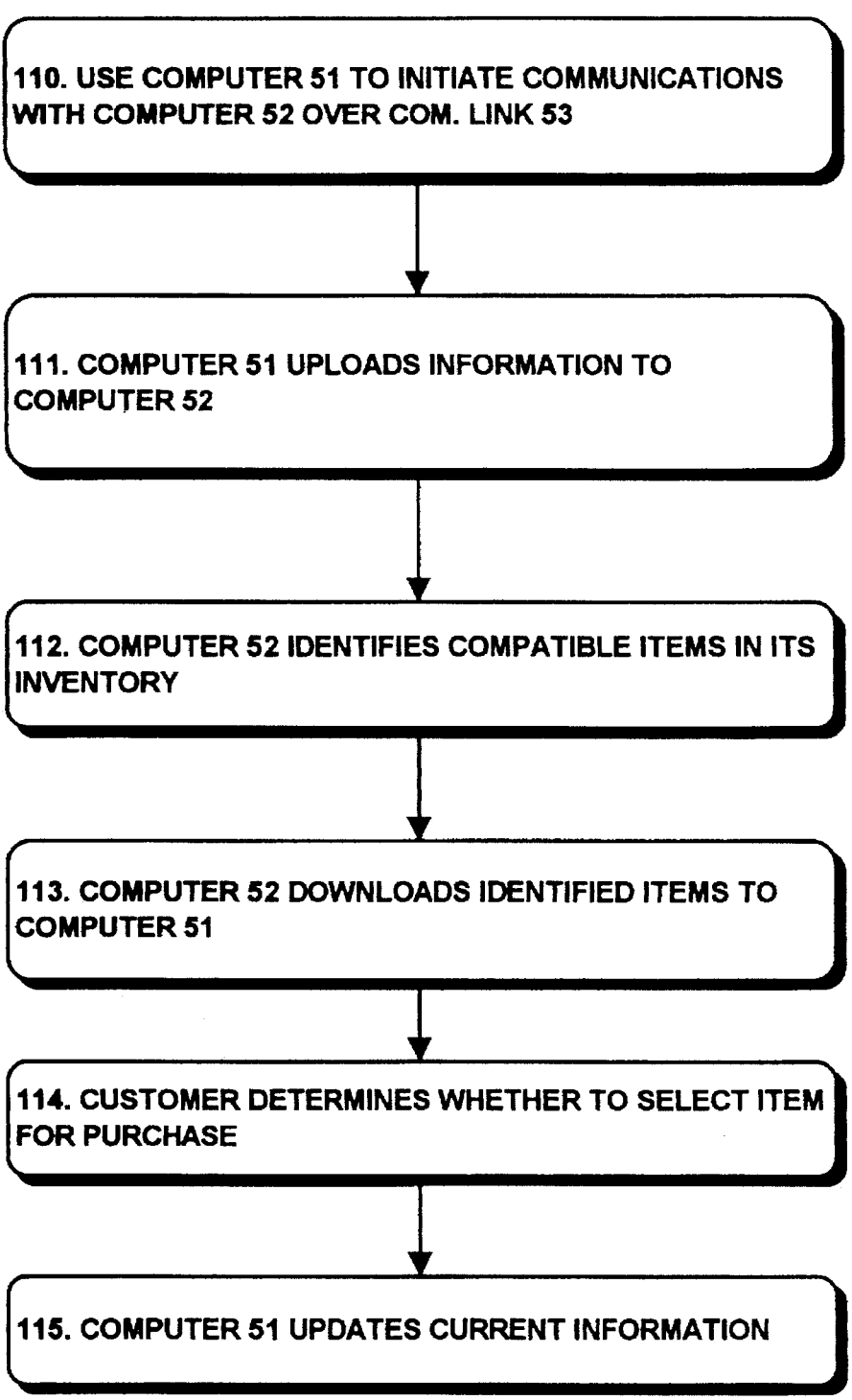

The operations by the computers 51 and 52 in accordance with the invention will be described in connection with FIGS. 4 and 5. In the operations depicted in FIG. 4, the catalog shopping outlet's computer downloads color and style parameter and metric information for items selected by the customer for processing on his or her computer 51, while in the operations depicted in FIG. 5, the customer's computer 51 uploads color and style parameter and metric information for processing by the catalog shopping outlet's computer 52. With reference to FIG. 4, the customer will initially use the computer 51 to contact and initiate communications with the catalog shopping outlet's computer 52 over communication link 53 (step 100). The customer, using his or her computer 51, may enable the catalog shopping outlet's computer 52 to download information concerning various selected items to the computer 51 (step 101), including the color and style parameter and metric information for the respective items. The customer may enable the computer 51 to store the downloaded information for later processing. Alternatively or in addition he or she may continue operations interactively.

After receiving the color and style parameter and metric information for the various selected items from the catalog shopping outlet's computer 52, the customer may enable his or her computer 51 to process the color and style parameter and metric information for the selected items received from the catalog shopping outlet's computer 52 along with the his or her current wardrobe information maintained by the information storage elements of the computer 51 and the compatibility information to determine whether the current wardrobe includes any items which may be compatible with the selected items (step 102). The customer may then use the determination made in step 102 in determining whether to purchase the items for which the catalog shopping outlet's computer 52 downloaded the information (step 103). If the customer selects any items for purchase (step 104), the computer 51 can update the current wardrobe color and style parameter and metric information with the information for the selected items (step 105).

As noted above, in the operations depicted in FIG. 5, the customer's computer 51 uploads color and style parameter and metric information for his or her current wardrobe to the catalog shopping outlet's computer 52, which may identify items offered by the catalog shopping outlet which may be compatible with the customer's current wardrobe. With reference to FIG. 5, the customer will initially use the computer 51 to contact and initiate communications with the catalog shopping outlet's computer 52 over communication link 53 (step 110). The customer, using his or her computer 51, may upload the color and style parameter and metric information for his or her current wardrobe, which is maintained by the computer 51, to the catalog shopping outlet's computer 52 (step 111). After receiving the color and style parameter and metric information for the customer's current wardrobe, the catalog shopping outlet's computer 52, will process the color and style parameter and metric information for the inventory items maintained by the catalog shopping outlet's computer 52 along with the corresponding information from the customer's computer and the compatibility information to identify items, if any, in the catalog shopping outlet's inventory which may be compatible with the customer's current wardrobe (step 112). The catalog shopping outlet's computer may download information concerning the identified items to the customer's computer (step 113), and the customer may then decide whether to purchase any of the items identified (step 114). If the customer selects any items for purchase (step 114), the computer 51 can update the current wardrobe color and style parameter and metric information with the information for the selected items (step 115).

It will be appreciated that a number of modifications and variations may be made in connection with the invention. For example, the particular color and/or style parameter and metric information in one embodiment corresponds to information in the uniform color space notation recommended by CIE known as CIELAB, although any other accurate color information may be utilized. Styles may be identified by for example, generally accepted style names or by alphanumeric code identifiers.

Further, a variety of types of compatibility parameter information may be used in connection with the invention Illustrative compatibility parameter information which is useful with the invention will be apparent to those skilled in the art from a number of publications, including, for example, Deanne Judd and G. Wyszecki, "Color in business, science and industry," (Wiley: N.Y., 1975) at pages 390–396, and Jackson, "Color Me Beautiful," (Ballantine Books: N.Y., 1981). Various types of compatibility parameter information will be readily apparent to those skilled in the art.

In addition, while the invention has been described in terms of selection of clothing using color and style parameter and metric information, a system constructed in accordance with the invention may be used in connection with other types of information or other indicia, or other types of products using a variety of indicia. For example, the invention may find great utility in connection with a customer's home furnishings, such as the color, style and other information which may be of interest in determining compatibility for paints and wallpapers, draperies, rugs, furniture and the like.

Furthermore, particularly in connection with the embodiment described above in connection with FIGS. 3 through 5, it will be appreciated that the invention may be used in a variety of applications and environments. In addition to providing a system whereby a prospective customer can initiate communications with a catalog shopping outlet over a network such as the public telephony system, a cable or wireless cable connection, the Internet, or the like, it will be appreciated that communications can be initiated by the catalog shopping outlet. For example, in home shopping over a television system, the catalog shopping outlet can broadcast color and/or style information which the customer's television or computer can receive and use to determine compatibility. In that case, the color and/or style information may be broadcast during, for example, the television signal's vertical blanking interval.

In addition, although systems in accordance with the invention have been described as providing an assessment as to the compatibility of selected items offered by retail shopping establishments and catalog shopping outlets with items currently in the customer's wardrobe, it will be appreciated that the systems can also be used to determine whether a plurality of items selected for purchase are compatible with each other, and whether a plurality of items already owned by the customer are compatible with each other.

A system constructed in accordance with the invention (in particular the embodiment described above in connection with FIGS. 1 and 2) provides a number of advantages. In particular, such a system allows a customer to select items without the necessity of taking particular items of his or her current wardrobe with him or her to the store for use in verifying compatibility, or in the alternative without not taking the items with him or her and relying on his or her memory to determine the degree to which items selected for purchased are compatible with items in his or her wardrobe. In addition, a system constructed in accordance with the invention (in particular the embodiment described above in connection with FIGS. 3 through 5) allows a customer to select items over a network using a computer or the like without having to rely on the often unreliable color rendering by video display monitors used in connection with conventional computer systems. Furthermore, a system constructed in accordance with the invention can provide a person with poor compatibility skills with a compatibility assessment which may help him or her in selecting items during shopping or in selecting compatible items which he or she already owns to be worn together.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for assisting a customer, the system comprising:

A. machine-readable currently-owned item indicia store for storing indicia identifying at least one selected characteristic of at least one item currently owned by the customer; and B. a compatibility determination subsystem for generating a compatibility assessment in response to the currently-owned item indicia stored by said currently-owned item indicia store, indicia identifying at least one selected characteristic for at least one item provisionally selected by the customer, and compatibility parameter information identifying compatibilities among various types of indicia.

2. A system as defined in claim 1 in which the currently-owned item indicia store comprises a smart-card having a store for storing the currently-owed item indicia as digital data in electrical form, and a contact area providing an electrical contact, the compatibility determination subsystem having electrical contacts for cooperating with the contact area to retrieve at least some of the currently-owned item indicia while generating a compatibility assessment.

3. A system as defined in claim 1 in which the currently-owned indicia store comprises a magnetic medium for storing the currently-owed item indicia as digital data in magnetic form, the compatibility determination subsystem having a disk drive for cooperating with the magnetic medium to retrieve at least some of the currently-owned item indicia while generating a compatibility assessment.

4. A system as defined in claim 1 in which the currently-owned item indicia comprises accurate color parameter and metric information.

5. A system as defined in claim 1 in which the compatibility determination subsystem includes selected item indicia input means for receiving selected item indicia input by an operator.

6. A system as defined in claim 5 in which the selected item indicia is in alphanumeric form and in which the selected item indicia input means includes a keyboard which an operator may use to input the alphanumeric selected item indicia.

7. A system as defined in claim 5 in which the selected item indicia is in the form of a bar code and in which selected item indicia input means includes a bar code reader which an operator may use to input the bar coded selected item indicia.

8. A system as defined in claim 1 in which the compatibility determination subsystem includes:

A. a currently-owned item indicia input for receiving the currently-owned item indicia stored by said currently-owned item indicia store;

B. a selected item indicia input for receiving the selected item indicia for the at least one item provisionally selected by the customer;

C. a compatibility parameter information store for storing the compatibility parameter information identifying compatibilities among various types of indicia; and D. a comparator for generating the compatibility assessment from the selected item indicia and currently-owned item indicia in relation to the compatibility parameter information.

9. A system as defined in claim 8 in which the compatibility determination means further includes an update element for updating the currently-owned item indicia stored by the currently-owned item indicia store if the customer purchases one of said selected items.

10. A compatibility determination subsystem for use in connection with a system for assisting a customer, the system comprising machine-readable currently-owned item indicia store for storing indicia identifying at least one selected characteristic of at least one item currently owned by the customer, the compatibility determination subsystem generating a compatibility assessment in response to the currently-owned item indicia stored by said currently-owned item indicia store, indicia identifying at least one selected characteristic for at least one item provisionally selected by the customer, and compatibility parameter information identifying compatibilities among various types of indicia, the compatibility determination subsystem including:

A. a currently-owned item indicia input for receiving the currently-owned item indicia stored by said currently-owned item indicia store;

B. a selected item indicia input for receiving the selected item indicia for the at least one item provisionally selected by the customer;

C. a compatibility parameter information store for storing the compatibility parameter information identifying compatibilities among various types of indicia; and D. a compatibility assessment generator for generating the compatibility assessment from the selected item indicia and currently-owned item indicia in relation to the compatibility parameter information.

11. A compatibility determination subsystem as defined in claim 10 in which the currently-owned item indicia store comprises a smart-card having a store for storing the currently-owed item indicia as digital data in electrical form, and a contact area providing an electrical contact, the currently-owned item indicia input having electrical contacts for cooperating with the contact area to retrieve at least some of the currently-owned item indicia while generating a compatibility assessment.

12. A compatibility determination subsystem as defined in claim 10 in which the currently-owned indicia store comprises a magnetic medium for storing the currently-owed item indicia as digital data in magnetic form, the currently-owned item indicia input having a disk drive for cooperating with the magnetic medium to retrieve at least some of the currently-owned item indicia while generating a compatibility assessment.

13. A compatibility determination subsystem as defined in claim 10 in which the currently-owned item indicia comprises accurate color parameter and metric information.

14. A compatibility determination subsystem as defined in claim 10 in which the selected item indicia is in alphanumeric form and in which the selected item indicia input includes a keyboard which an operator may use to input the alphanumeric selected item indicia.

15. A compatibility determination subsystem as defined in claim 10 in which the selected item indicia is in the form of a bar code and in which selected item indicia input includes a bar code reader which an operator may use to input the bar coded selected item indicia.

16. A compatibility determination subsystem as defined in claim 10 in which the compatibility determination means further includes an update element for updating the currently-owned item indicia stored by the currently-owned item indicia store if the customer purchases one of said at least one selected item.

17. A machine-readable currently-owned item indicia store for storing indicia identifying selected characteristics of items currently owned by the customer for assisting a customer, the currently-owned item indicia store including a smart-card for storing the indicia as digital data in electrical form, and output means comprising a contact area providing an electrical contact for enabling the data to be retrieved during shopping.

18. A currently-owned item indicia store as defined in claim 17 in which the currently-owned item indicia comprises accurate color parameter and metric information.

19. A currently-owned item indicia store as defined in claim 17 in which the currently-owned item indicia comprises accurate color parameter and metric information.

20. A machine-readable currently-owned item indicia store for storing indicia identifying selected characteristics of items current for assisting a customer, the currently-owned item indicia store including a magnetic storage medium for storing the indicia as digital data in magnetic form, and output means for enabling the data to be retrieved during shopping.

21. A compatibility assessment generating system for generating a compatibility assessment for an item in response to item indicia associated with at least one selected characteristic of said item and other indicia, in relation to compatibility parameter information, the compatibility assessment generating system including:

A. an indicia input for receiving the item indicia and the other indicia;

B. a compatibility parameter information store for storing the compatibility parameter information identifying compatibilities among values associated with each of said item indicia and said other indicia; and C. a compatibility assessment generator for generating the compatibility assessment from the item indicia and the other indicia in relation to the compatibility parameter information.

22. A compatibility assessment generating system as defined in claim 21, the compatibility assessment generating system being used by a customer to determine compatibility of said item to said customer, the other indicia being associated with at least one selected characteristic of said customer.

23. A compatibility assessment generating system as defined in claim 21, the compatibility assessment generating system being used by a customer to determine compatibility of said item to at least one other item, the other indicia being associated with at least one selected characteristic of said at least one other item.

24. A compatibility assessment generating system as defined in claim 21 in which the other indicia is stored on a smart-card having a store for storing the currently-owed item indicia as digital data in electrical form, and a contact area providing an electrical contact, the indicia input having electrical contacts for cooperating with the contact area to retrieve at least some of the other indicia while generating a compatibility assessment.

25. A compatibility assessment generating system as defined in claim 21 in which the other indicia is stored on a magnetic medium for storing the currently-owed item indicia as digital data in magnetic form, the indicia input having a disk drive for cooperating with the magnetic medium to retrieve at least some of the other indicia while generating a compatibility assessment.

26. A compatibility assessment generating system as defined in claim 21 in which the other indicia comprises accurate color parameter and metric information.

27. A compatibility assessment generating system as defined in claim 21 in which the item indicia is in alphanumeric form and in which the indicia input includes a keyboard operable by an operator to input the alphanumeric selected item indicia.

28. A compatibility assessment generating system as defined in claim 21 in which the item indicia is in the form of a bar code and in which indicia input includes a bar code reader operable by an operator to input the bar coded item indicia.

* * * * *